(12) United States Patent
Vetter

(10) Patent No.: US 7,841,365 B2
(45) Date of Patent: Nov. 30, 2010

(54) APPARATUS FOR CONTROLLING FLOW THROUGH A CONDUIT

(76) Inventor: Kim Vetter, Box 174, Hughenden, AB (CA) T0B 2E0

( * ) Notice: Subject to any disclaimer, the term of this patent is extended or adjusted under 35 U.S.C. 154(b) by 642 days.

(21) Appl. No.: 11/861,041

(22) Filed: Sep. 25, 2007

(65) Prior Publication Data

US 2008/0072980 A1    Mar. 27, 2008

(30) Foreign Application Priority Data

Sep. 25, 2006    (CA) .................................. 2560793

(51) Int. Cl.
*F16L 55/10* (2006.01)

(52) U.S. Cl. ........................ 138/94.3; 138/94; 138/44; 138/45

(58) Field of Classification Search .................. 138/94, 138/94.3, 44, 45
See application file for complete search history.

(56) References Cited

U.S. PATENT DOCUMENTS

| | | | | |
|---|---|---|---|---|
| 1,189,003 A | * | 6/1916 | Schnuck | ............ 138/94.3 |
| 2,029,151 A | | 1/1936 | Bigelow | |
| 2,780,232 A | * | 2/1957 | Ney | ............ 137/238 |
| 3,047,024 A | * | 7/1962 | Heri | ............ 138/94.3 |
| 3,319,661 A | * | 5/1967 | Shindler | ............ 138/94.3 |
| 3,442,286 A | * | 5/1969 | Anderson et al. | ...... 137/246.22 |
| 3,480,301 A | * | 11/1969 | Kroening | ............ 285/119 |
| 3,620,554 A | * | 11/1971 | Ward et al. | ............ 285/18 |
| 3,695,299 A | | 10/1972 | Rodgers | |
| 3,781,043 A | * | 12/1973 | Hagmann | ............ 285/363 |
| 4,002,344 A | * | 1/1977 | Smith | ............ 277/609 |
| 4,271,870 A | * | 6/1981 | Butler et al. | ............ 138/94.3 |
| 5,148,829 A | * | 9/1992 | Deville | ............ 137/486 |
| 5,160,119 A | * | 11/1992 | Lemire et al. | ............ 251/212 |
| 5,582,211 A | | 12/1996 | Monson | |
| 6,085,793 A | | 7/2000 | Mayhew | |
| 7,017,886 B1 | | 3/2006 | Ngene-Igwe | |
| 2003/0056843 A1 | | 3/2003 | Carey | |
| 2007/0169828 A1 | * | 7/2007 | Orleskie et al. | ............ 138/94 |

* cited by examiner

*Primary Examiner*—James F Hook
(74) *Attorney, Agent, or Firm*—Patterson Thuente Christensen Pedersen P.A.

(57) ABSTRACT

A conduit apparatus includes a slide plate between faces of flanges connecting a first and second conduit portions. Upper and lower fasteners extend through bolt holes in the flanges above and below the slide plate. Right aid left fasteners extend through bolt holes in the flanges and through bolt holes in the slide plate. The slide plate can be located in a first position where the right and left fasteners extend through a first set of bolt holes in the slide plate and where a first portion of the slide plate is between the faces of the flanges, and in a second position where the right and left fasteners extend through a second set of bolt holes in the slide plate and where a second portion of the slide plate is between the faces of the flanges. The slide plate can be configured to allow or block or restrict flow.

20 Claims, 3 Drawing Sheets

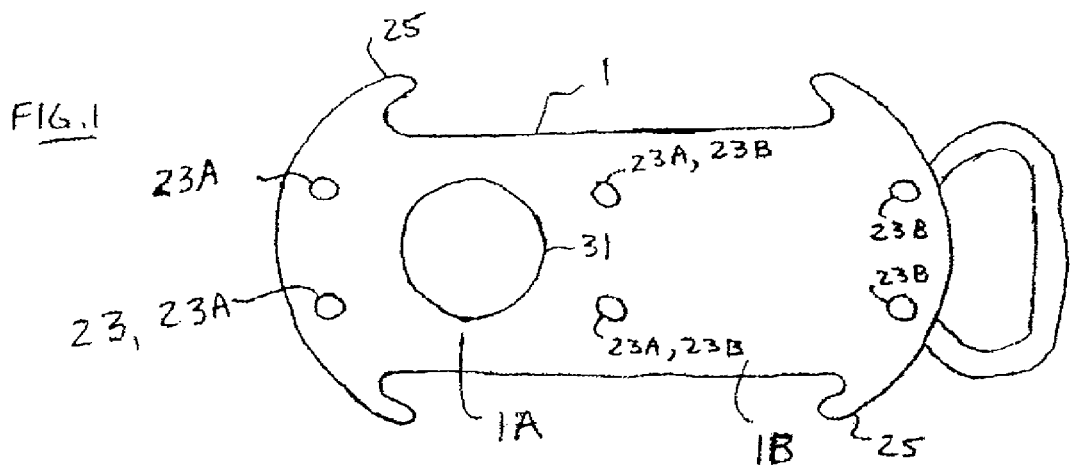
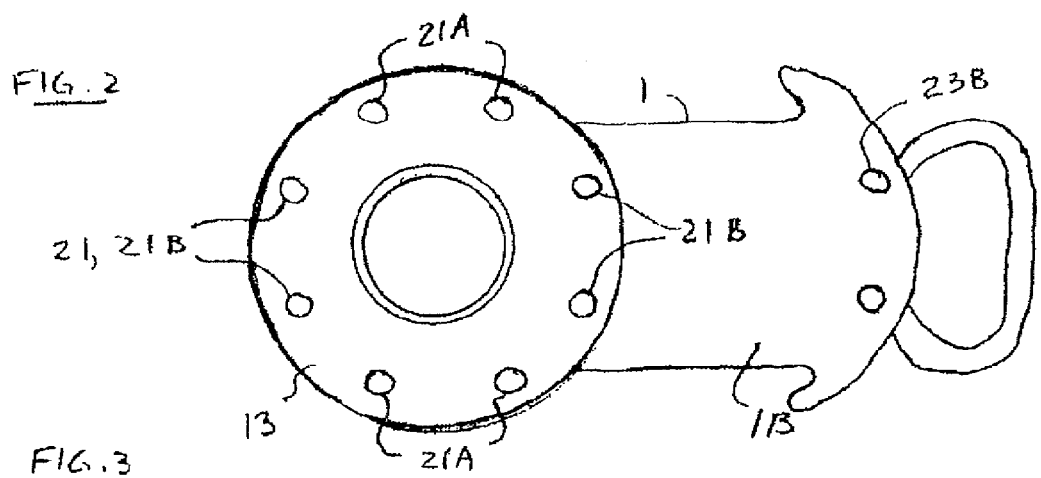
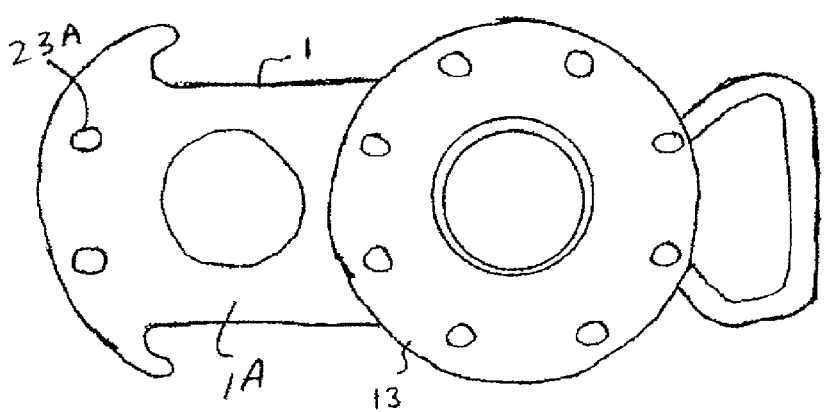

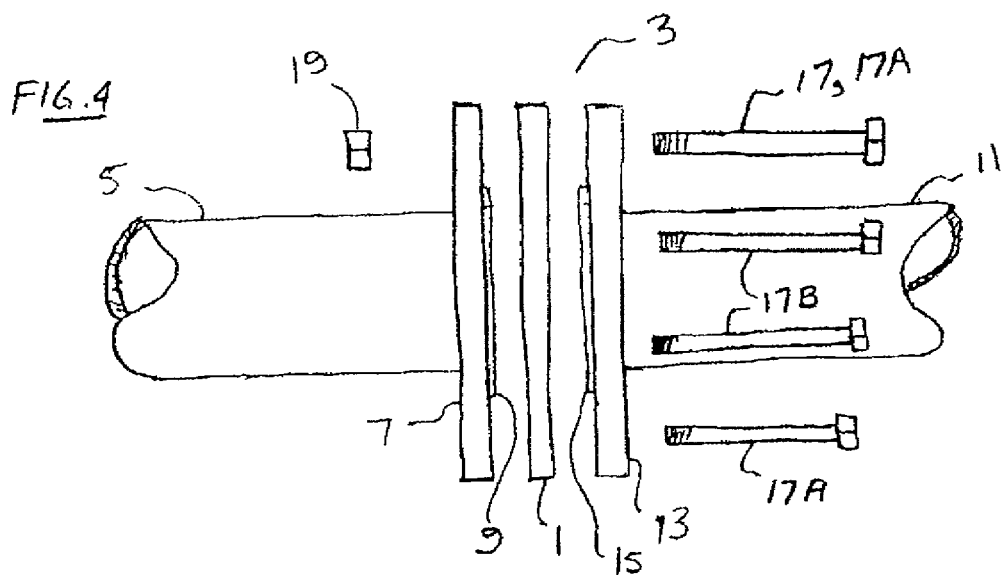
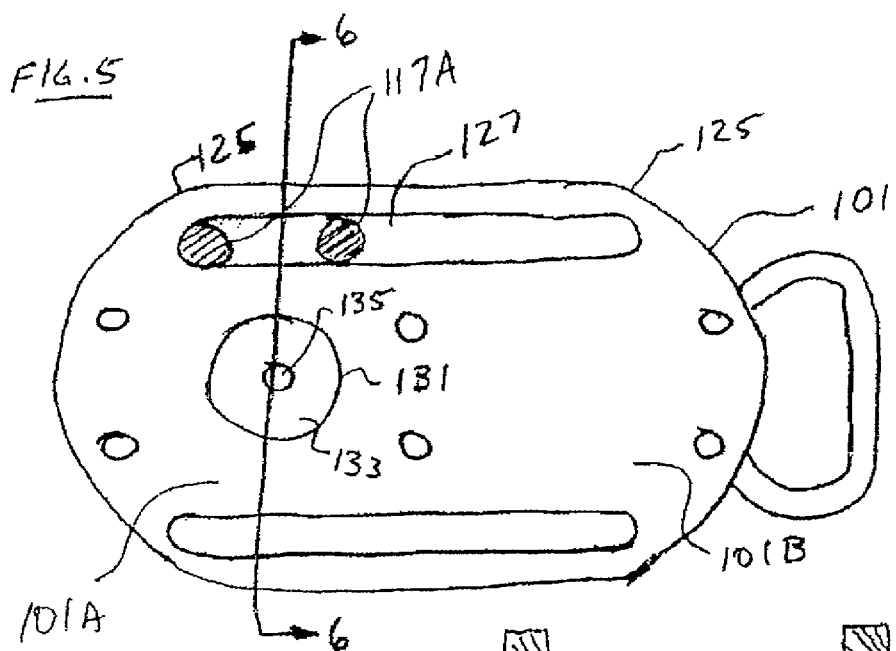
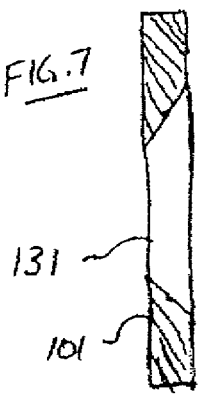
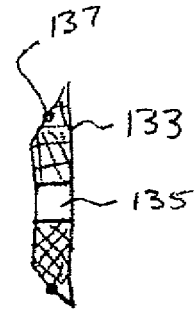

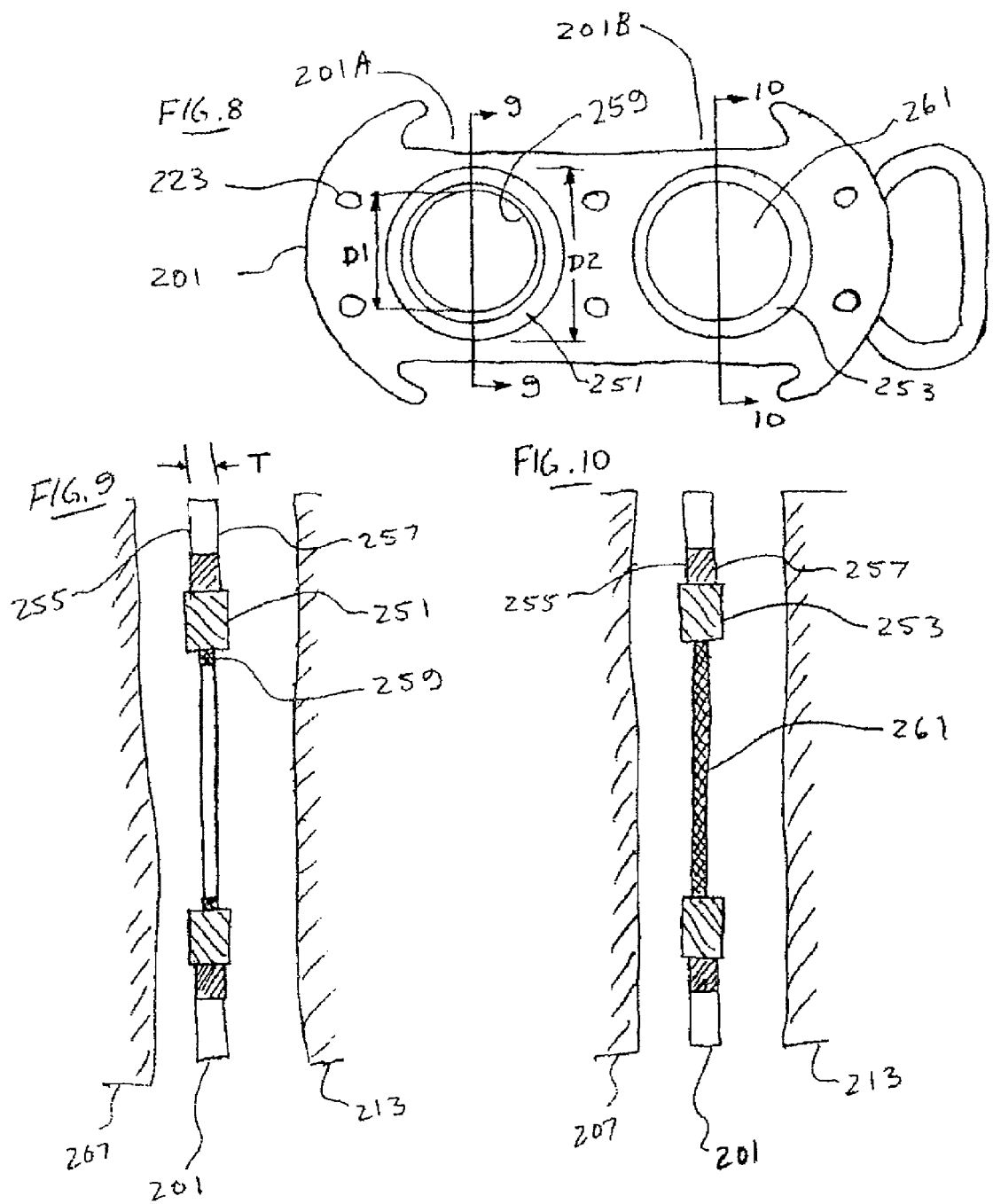

APPARATUS FOR CONTROLLING FLOW THROUGH A CONDUIT

This invention relates to pipes, conduits, and the like and in particular to an apparatus for controlling flow through a conduit by blocking or restricting the flow.

BACKGROUND

Networks of conduits are found in many industrial applications. While it is common to provide a valve to control flow through a conduits it is sometimes required to completely isolate pipes, tanks, or like equipment for cleaning, maintenance, modification, and so forth. For safety reasons a blind plate is provided, commonly at a flanged connection and secured in position to completely block off the conduit and prevent the passage of fluid, either liquid or gas as the case may be, therethrough. In a simple blind plate device, a flanged connection is opened sufficiently, by removing the required number of bolts and prying the flanges apart if necessary, to allow a blind plate to be placed between the two flanges. The bolts are then re-inserted and tightened. A typical blind plate device has a first portion that defines a flow aperture substantially equal in diameter to the conduit, and a second portion that is solid and blocks flow through the conduit. Thus it is readily apparent on viewing the flanged connection with the blind plate installed whether the device is oriented such that the conduit is open or closed.

Typically such flanged connections include a seal between the flanges. When the blind plate is used, a seal is required on each side of the blind plate to seal the blind plate to each flange. When changing the location of the blind plate it is necessary to ensure that the seals are properly oriented and fitted so that they seal properly when the flanges are re-tightened. This requirement adds time to the procedure, and improper fitting may require that the procedure be re-done.

Similar types of blind plates are described in United States Published Patent Application 2003/0056843 of Carey and in U.S. Pat. No. 6,085,793 to Mayhew. The blind plate described in U.S. Pat. No. 5,582,211 to Monson is also adapted for purging a conduit.

Blind plates are also known where a valve plate body is provided in a conduit and the blind plate has a solid closed portion and an open portion defining an aperture typically the same diameter as the conduit. The blind plate can slide in the valve plate body from an open position, where the open portion is aligned with the conduit, to a closed position where the closed portion blocks the conduit. Such a device is illustrated for example in U.S. Pat. No. 3,695,299 to Rodgers and in U.S. Pat. No. 7,017,886 to Ngene-Igwe.

It is also sometimes desired, such as for gas flow measurement, to temporarily restrict the flow of fluid through a conduit by providing an orifice in the conduit that is smaller than the inside of the conduit. U.S. Pat. No. 5,160,119 to Lemire et al. discloses a slide plate apparatus that provides an orifice that can be made smaller or larger by moving a pair of slide plates relative to each other.

SUMMARY OF THE INVENTION

It is an object of the present invention to provide an apparatus for blocking or restricting flow through a conduit that overcomes problems in the prior art.

In a first embodiment the present invention provides a slide plate apparatus for controlling flow through conduits at a flanged connection comprising a first conduit and a first flange mounted to an end thereof, a second conduit and a second flange mounted to an end, and flange fasteners extending through corresponding bolt holes defined by the first and second flanges and operative to draw the first and second flanges toward each other. The slide plate apparatus comprises a slide plate adapted to be secured between the faces of the first and second flanges, the slide plate configured such that upper and lower flange fasteners extend through corresponding upper and lower bolt holes defined by the first and second flanges above and below the slide plate; right and left fasteners extend through corresponding right and left bolt holes defined by the first and second flanges and through corresponding bolt holes defined by the slide plate. The slide plate comprises first and second portions, and the slide plate defines a plurality of bolt holes configured such that the slide plate can be located in an first position where the right and left fasteners extend through a first set of bolt holes in the slide plate and where the first portion of the slide plate is located between the faces of the first and second flanges, and can be located in a second position where the right and left fasteners extend through a second set of bolt holes in the slide plate and where the second portion of the slide plate is located between the faces of the first and second flanges.

In a second embodiment the present invention provides a conduit apparatus comprising a first conduit and a first flange mounted to an end of the first conduit. A second conduit has a second flange mounted to an end of the second conduit. A slide plate is located between the faces of the first and second flanges. Upper and lower fasteners extend through corresponding upper and lower bolt holes defined by the first and second flanges above and below the slide plate. Right and left fasteners extend through corresponding right and left bolt holes defined by the first and second flanges and through corresponding bolt holes defined by the slide plate. The fasteners are operative to draw the first and second flanges toward each other and toward at least one seal. The slide plate comprises first and second portions, and die slide plate defines a plurality of bolt holes configured such that the slide plate can be located in a first position where the right and left fasteners extend through a first set of bolt holes in the slide plate and where the first portion of the slide plate is located between the faces of the first and second flanges, and can be located in a second position where the right and left fasteners extend through a second set of bolt holes in the slide plate and where the second portion of the slide plate is located between the faces of the first and second flanges.

The first and second portions of the slide plate can be variously configured to define, for example, a flow aperture substantially aligned with the conduits to allow full flow, a solid block to block flow through the conduits, or an adjustable orifice to restrict flow through the conduits. The portions will be configured as desired for a particular application, and the invention thus provides a versatile apparatus for controlling flow in a variety of ways.

In one embodiment seals are incorporated into the slide plate to facilitate moving the slide plate between positions, and sealing the slide plate in position.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

FIG. 1 is a front view of an embodiment of a slide plate of the present invention;

FIG. 2 is a schematic front view of a flanged connection using the slide plate of FIG. 1 in a position to allow full flow through the connected conduits;

FIG. 3 is a schematic front view of a flanged connection using the slide plate of FIG. 1 in a position to block flow through the connected conduits;

FIG. 4 is an exploded schematic side view of the flanged conduit connection of FIGS. 2 and 3;

FIG. 5 is a front view of an alternate embodiment of a slide plate of the present invention, defining an insert aperture and an orifice insert;

FIG. 6 is a schematic sectional view along line 6-6 in FIG. 5 showing the orifice insert in die insert aperture;

FIG. 7 shows the orifice insert of FIG. 6 removed from the insert aperture;

FIG. 8 is a front view of an alternate embodiment of a slide plate of the present invention;

FIG. 9 is a sectional view along line 9-9 in FIG. 8;

FIG. 10 is a sectional view along line 10-10 in FIG. 8.

DETAILED DESCRIPTION OF THE ILLUSTRATED EMBODIMENTS

FIG. 1 illustrates an embodiment of a slide plate 1 of the invention for controlling flow through conduits at a flanged connection as illustrated in the conduit apparatus 3 shown in FIGS. 2-4. The conduit apparatus 3 comprises a first conduit 5 and a first flange 7 mounted to an end of the first conduit 5, and a second conduit 11 and a second flange 13 mounted to an end of the second conduit 11. The slide plate 1 is located between the faces of the first and second flanges 7, 13.

The illustrated apparatus 3 has a first seal 9 mounted on a face of the first flange 7, and a second seal 15 mounted on the face of the second flange 13. Front and rear faces of the slide plate 1 are substantially smooth such that the seals 9,15 can be placed between the slide plate 1 and the faces of the flanges 7, 13 to seal the flanged connection. An alternate sealing arrangement is described below, where a seat is incorporated into the slide blind 1.

The flanges 7, 13 are connected by fasteners illustrated as bolts 17, with corresponding nuts 19 as shown in FIG. 4. The bolts 17 and nuts 19 are operative to draw the first and second flanges 7, 13 toward each other such that the seats 9, 15 seal against opposite surfaces of the slide plate 1. Pairs of upper and lower bolts 17A extend through corresponding pairs of upper and lower bolt holes 21A defined by the first and second flanges 7, 13 above and below the slide plate 1. Pairs of right and left bolts 17B extend through corresponding pairs of right and left bolt holes 21B defined by the first and second flanges 7, 13 and through corresponding bolt holes 23 defined by the slide plate 1.

The slide plate 1 comprises first and second portions 1A, 1B and the slide plate 1 defines a plurality of bolt holes 23 configured such that the slide plate 1 can be located in a first position, illustrated in FIG. 2, where the right and left bolts 17B extend through a first set of bolt holes 23A in the slide plate 1 and where the first portion 1A of the slide plate 1 is located between the faces of the first and second flanges 7, 13, and can be located in a second position, illustrated in FIG. 3, where the right and left bolts 17B extend through a second set of bolt holes 23B in the slide plate 1 and where the second portion 1B of the slide plate 1 is located between the faces of the first and second flanges 7, 13. The middle bolt holes 23A, 2313 in the slide plate 1 are part of both sets of bolt holes.

In operation the slide plate 1 can be moved from one position to the other by removing only the right and left bolts 17B and loosening the upper and lower bolts 17A. The slide plate 1 is retained loosely between the faces of the flanges 7, 13 lightly bearing against the seals 9, 15 so that the risk of the seals 9, 15 moving out of position is reduced, and the assembly of the conduit apparatus 3 is maintained, thus reducing the time required to change positions, compared with conventional blind plates requiring removal of all bolts fastening the flanges together. The configuration of the seals, flanges, and blind plate surfaces in the conduit apparatus 3 is maintained the same in either position, compared to prior art blind plates that pivot about a flange bolt, and thus vary the distance between the faces of the flanges.

In a simple form the slide plate 1 could be configured to be removable by sliding between the flanges 7, 13 and out to the side. In order to ensure the slide plate 1 is maintained in the apparatus 3, the illustrated slide plate 1 includes slide plate extensions 25 extending up and down from the part of side plate 1 that fits between the upper and lower bolts 17A. To further facilitate movement and re-installation of the slide plate 1 the extensions 25 are configured to bear against one of the upper and the lower bolts 17A when the slide plate 1 is in the first position, thereby aligning the right and left bolt holes 21B in the flanges 7, 13 with the first set of bolt holes 23A in the slide plate 1, and to bear against another of the upper and the lower bolts 17A when the slide plate 1 is in the second position, thereby aligning the right and left bolt holes 21B in the flanges with the second set of bolt holes 23B in the slide plate 1.

FIG. 5 illustrated an alternate embodiment of the slide plate 101 where the extensions 125 on each end of the slide plate are connected, thereby forming a slot 127 where the upper and lower bolts 117A can slide. One of the pair of upper bolts 117A is at a first end of the slot 127 when the slide plate 101 is in the first position, and the other of the pair of upper bolts 117A is at a second end of the slot 127 when the slide plate 101 is in the second position. The embodiment of FIGS. 1-3 where the extensions 125 are not connected more easily allows insertion of a pry bar between the faces of the flanges 7, 13 thereby facilitating spreading of the flanges to release the slide plate 1 for sliding from one position to the other.

The flanges 7, 13 illustrated are conventional 8 hole flanges with pairs of upper lower, right, and left bolt holes 21. Such flanges are also known with 4 holes, comprising only single upper lower, right, and left bolt holes. The side plate 1 can be configured to operate in a similar manner for use with 4 hole flanges.

In the slide plate 1 of FIGS. 1-3 the first portion 1A of the slide plate 1 defines a flow aperture 31 that is substantially aligned with the first and second conduits 5, 11 when the slide plate 1 is in the first position illustrated in FIG. 2. In this position there is no restriction on full flow through the conduits 5, 11. The second portion 1B of the slide plate 1 is solid and blocks flow through the first and second conduits 5, 11 when the slide plate 1 is in the second position illustrated in FIG. 3. FIGS. 2 and 3 also show that it is readily apparent on viewing the flanged connection whether the slide plate is in the open first position, or in the blocked second position.

Alternatively as illustrated in FIGS. 5-7 one of the portions of the slide plate 101 could instead be used to define an orifice and restrict flow through the conduits when the slide plate is in the second position. The portion 101A defines a tapered aperture 131, and an insert member 133 defines an orifice 135 and is configured to be inserted into the aperture 131 where it is substantially sealed and retained with an o-ring 137 or the like. A plurality of insert members 133 can be provided, each defining an orifice 135 of a different size.

In FIG. 6 flow is in the direction F such that the tapered insert member 131 is pushed into the insert aperture 133. The other portion 101B of the slide plate 101 in the embodiment illustrated in FIGS. 5-7 is solid and operates to block the conduits, but the portion 101B could also define a flow aperture to allow full flow, or be otherwise configured as desired.

FIGS. 8-10 illustrated an alternate embodiment of the slide plate 201 that, instead of requiring separate seals as in the apparatus described above, includes seals 251, 253 incorporated into the slide plate 201. The illustrated blind plate 201, like the blind plate 1 described above, comprises first and second portions 201A, 201B and bolt holes 223 configured such that the slide plate 201 can be located with the first portion 201A between the faces of a pair of flanges 207, 213, or can be located with the second portion 201B between the flange faces.

As seen in FIGS. 9 and 10, the seals 251, 253 are somewhat thicker than the slide plate 201. Thus on the first side 201A of the slide plate 201, the first seal 251 extends from the first face 255 of the blind plate 201 toward the first flange 207, and also extends from the second face 257 of the blind plate 201 toward the second flange 213 when the slide blind is in the first position, as schematically illustrated in FIG. 9.

On the second side 201B of the slide blind 20, the second seal 253 extends from the first face 255 of the blind plate 201 toward the first flange 207, and extends from the second face 257 of the blind plate 201 toward the second flange 213 when the slide blind 201 is in the second position, as schematically illustrated in FIG. 10.

Since the seals 251 and 253 extend outward from each face 255, 257 of the slide plate 201, when the flanges 207, 213 are drawn toward each other by flange fasteners with the seal 251 or 253 between the flanges, the flanges 207, 213 will bear against the seal rather than against the faces 255, 257 of the slide plate 201, and thus seal. The seals 251, 253 will be selected to have a compressed thickness that is greater than the thickness T of the slide plate 201, such the seal will be maintained when the flange fasteners are tightened.

The seals 251, 253 are conveniently provided by spiral wound gaskets, such as are well known in the art, and are available for example from Lamons Gasket Company of Houston, Tex. These spiral wound gaskets are manufactures by alternately winding strips of metal and soft fillers top make a strong and relatively rigid gasket suitable for mounting in the slide plate 201. The gaskets are available in various thicknesses, diameters, etc. or can be made to order.

Like the slide plate 1 described above, the illustrated slide plate 201 is designed to have an open side at 201A that defines a flow aperture 231 that is substantially aligned with conduits attached to the flanges 207, 213 when the slide plate 201 is in the first position illustrated in FIG. 9. In this position there is no restriction on full flow through the conduits. The spiral wound gasket seal 251 has an inner ring 259 with an inside diameter D1 substantially equal to the inside diameter of the conduits connected to the flanges 207, 213. The slide plate 201 is made to define seal apertures substantially equal to the outside diameter D2 of the seals 251, 253. The seals are then fitted into the seal apertures.

The second portion 201B of the slide plate 201 is solid and blocks flow through the conduits attached to the flanges 207, 213 when the slide plate 201 is in the second position illustrated in FIG. 10. The seal 253 has, in place of the inner ring 259, an inner plate 261 that blocks any flow through the slide plate 201.

The slide plate 201 thus facilitates changing the slide plate 201 back and forth between the open position, with the first side 201A between the flanges 207, 213, and the closed position with the second side 201B between the flanges. The seals 251, 253 are integrated into the slide plate 201 and thus it is not necessary to ensure that external seals are in the proper position before tightening the connection.

The slide plates 1, 101, 201 of the invention can be configured to control or block flow through a flanged conduit connection as desired.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A slide plate apparatus for controlling flow through conduits at a flanged connection comprising a first conduit and a first flange mounted to an end thereof, a second conduit and a second flange mounted to an end thereof, and flange fasteners extending through corresponding bolt holes defined by the first and second flanges and operative to draw the first and second flanges toward each other, the slide plate apparatus comprising:
   a slide plate adapted to be secured between the faces of the first and second flanges, the slide plate configured such that:
       upper and lower flange fasteners extend through corresponding upper and lower bolt holes defined by the first and second flanges above and below the slide plate;
       right and left fasteners extend through corresponding right and left bolt holes defined by the first and second flanges and through corresponding bolt holes defined by the slide plate;
       wherein the slide plate comprises first and second portions, and the slide plate defines a plurality of bolt holes configured such that the slide plate can be located in a first position where the right and left fasteners extend through a first set of bolt holes in the slide plate and where the first portion of the slide plate is located between the faces of the first and second flanges, and can be located in a second position where the right and left fasteners extend through a second set of bolt holes in the slide plate and where the second portion of the slide plate is located between the faces of the first and second flanges;
   a first slide plate extension extending from the slide plate and configured to bear against one of the upper and the lower flange fasteners when the slide plate is in the first position, thereby aligning the right and left bolt holes in the flanges with the first set of bolt holes in the slide plate; and
   a second slide plate extension extending from the slide plate and configured to bear against one of the upper and the lower flange fasteners when the slide plate is in the second position, thereby aligning the right and left bolt holes in the flanges with the second set of bolt holes in the slide plate.

2. The apparatus of claim 1 comprising a first seal extending from a first face of the slide plate toward the first flange, and extending from a second face of the slide plate toward the second flange when the slide plate is in the first position, and a second seal extending from the first face of the slide plate toward the first flange, and extending from the second face of the slide plate toward the second flange when the slide plate is in the second position.

3. The apparatus of claim 1 wherein front and rear faces of the slide plate are substantially smooth such that a seal can be placed between the slide plate and at least one of the first and second flanges to seal the flanged connection.

4. The apparatus of claim 1 wherein the first portion of the slide plate defines a flow aperture substantially aligned with the first and second conduits when the slide plate is in the first position.

5. The apparatus of claim 1 wherein the second portion of the slide plate is solid and blocks flow through the first and second conduits when the slide plate is in the second position.

6. The apparatus of claim 1 wherein the second portion of the slide plate defines an orifice and restricts flow through the first and second conduits when the slide plate is in the second position.

7. The apparatus of claim 6 wherein a size of the orifice can be changed.

8. The apparatus of claim 7 wherein the second portion of the slide plate defines an insert aperture, and further comprising a plurality of insert members each defining an orifice, and each configured to be secured in the insert aperture.

9. The apparatus of claim 1 wherein the first and second side plate extensions are connected to form a slot, and wherein a flange fastener is located at a first end of the slot when the slide plate is in the first position, and a flange fastener is located at a second end of the slot when the slide plate is in the second position.

10. A conduit apparatus comprising:
a first conduit and a first flange mounted to an end of the first conduit;
a second conduit and a second flange mounted to an end of the second conduit;
a slide plate located between the faces of the first and second flanges;
upper and lower fasteners extending through corresponding upper and lower bolt holes defined by the first and second flanges above and below the slide plate;
right and left fasteners extending through corresponding right and left bolt holes defined by the first and second flanges and through corresponding bolt holes defined by the slide plate;
wherein the fasteners are operative to draw the first and second flanges toward each other and toward at least one seal;
wherein the slide plate comprises first and second portions, and the slide plate defines a plurality of bolt holes configured such that the slide plate can be located in a first position where the right and left fasteners extend through a first set of bolt holes in the slide plate and where the first portion of the slide plate is located between the faces of the first and second flanges, and can be located in a second position where the right and left fasteners extend through a second set of bolt holes in the slide plate and where the second portion of the slide plate is located between the faces of the first and second flanges;
a first slide plate extension extending from the slide plate and configured to bear against one of the upper and the lower fasteners when the slide plate is in the first position, thereby aligning the right and left bolt holes in the flanges with the first set of bolt holes in the slide plate; and
a second slide plate extension extending from the slide plate and configured to bear against one of the upper and the lower fasteners when the slide plate is in the second position, thereby aligning the right and left bolt holes in the flanges with the second set of bolt holes in the slide plate.

11. The apparatus of claim 10 comprising a first seal extending from a first face of the slide plate toward the first flange, and extending from a second face of the slide plate toward the second flange when the slide plate is in the first position, and a second seal extending from the first face of the slide plate toward the first flange, and extending from the second face of the slide plate toward the second flange when the slide plate is in the second position.

12. The apparatus of claim 10 wherein front and rear faces of the slide plate are substantially smooth such that a seal can be placed between the slide plate and at least one of the first and second flanges to seal the flanged connection.

13. The apparatus of claim 10 wherein the first portion of the slide plate defines a flow aperture substantially aligned with the first and second conduits when the slide plate is in the first position.

14. The apparatus of claim 10 wherein the second portion of the slide plate is solid and blocks flow through the first and second conduits when the slide plate is in the second position.

15. The apparatus of claim 10 wherein the second portion of the slide plate defines an orifice and restricts flow through the first and second conduits when the slide plate is in the second position.

16. The apparatus of claim 15 wherein a size of the orifice can be changed.

17. The apparatus of claim 16 wherein the second portion of the slide plate defines an insert aperture, and further comprising a plurality of insert members each defining an orifice, and each configured to be secured in the insert aperture.

18. The apparatus of claim 10 comprising:
two upper fasteners extending through two corresponding upper bolt holes defined by the first and second flanges above the slide plate;
two lower fasteners extending through two corresponding lower bolt holes defined by the first and second flanges below the slide plate;
two right fasteners extending through two corresponding right bolt holes defined by the first and second flanges and through two bolt holes defined by the slide plate;
two left fasteners extending through two corresponding left bolt holes defined by the first and second flanges and through two bolt holes defined by the slide plate.

19. The apparatus of claim 18 further comprising:
the first slide plate extension is configured to bear against one of the upper fasteners when the slide plate is in the first position, thereby aligning the right bolt holes in the flanges and the left bolt holes in the flanges with the first set of bolt holes in the slide plate;
the second slide plate extension is configured to bear against the other of the upper fasteners when the slide plate is in the second position, thereby aligning the right bolt holes in the flanges and the left bolt holes in the flanges with the second set of bolt holes in the slide plate.

20. The apparatus of claim 19 wherein the first and second side plate extensions are connected to form a slot, and wherein one of the upper fasteners is at a first end of the slot when the slide plate is in the first position, and wherein the other of the upper fasteners is at a second end of the slot when the slide plate is in the second position.

* * * * *